(12) United States Patent
Baney et al.

(10) Patent No.: US 6,486,984 B1
(45) Date of Patent: Nov. 26, 2002

(54) WAVELENGTH MONITOR USING HYBRID APPROACH

(75) Inventors: Douglas M. Baney, Palo Alto, CA (US); Norihide Yamada, Tokyo (JP); Satoshi Watanabe, Yokohama (JP); Shigeru Nakagawa, Goleta, CA (US); Yoshikatsu Ichimura, Tokyo (JP)

(73) Assignee: Agilent Technologies, Inc., Palo Alto, CA (US)

( * ) Notice: Subject to any disclaimer, the term of this patent is extended or adjusted under 35 U.S.C. 154(b) by 0 days.

(21) Appl. No.: 09/326,338

(22) Filed: Jun. 7, 1999

(51) Int. Cl.[7] .......................... H04J 14/02; G02B 6/28; H01S 3/10
(52) U.S. Cl. .................. 359/124; 359/130; 385/24; 372/20
(58) Field of Search ................................ 359/124, 130, 359/189, 132, 133; 385/37, 140, 24

(56) References Cited

U.S. PATENT DOCUMENTS

| | | | |
|---|---|---|---|
| 5,037,169 A | | 8/1991 | Chun .......................... 385/16 |
| 5,629,951 A | * | 5/1997 | Chang-Hasnain et al. .... 372/20 |
| 5,680,490 A | * | 10/1997 | Cohen et al. .................. 385/24 |
| 5,825,792 A | | 10/1998 | Villeneuve et al. ........... 372/32 |
| 5,850,292 A | | 12/1998 | Braun ......................... 356/419 |
| 5,991,477 A | * | 11/1999 | Ishikawa et al. .............. 385/24 |
| 6,243,179 B1 | * | 6/2001 | Thompson et al. ......... 359/130 |

OTHER PUBLICATIONS

Babic, Dubravko I., et al., "Modal Reflection of Quarter–Wave Mirrors in Vertical–Cavity Lasers," IEEE Journal of Quantum Electronics, vol. 59, No. 6, Jun. 1993, pp. 1950–1962.
Hendow, Sami T., "High–bandwidth networks bring new monitoring requirements," Laser Focus World, Aug. 1998, pp. 171–178.
Stanley, R.P., et al., "Ultrahigh finesse microcavity with distributed Bragg reflectors," Applied Physics Letters, vol. 65, No. 15, Oct. 10, 1994, pp. 1883–1885.

* cited by examiner

Primary Examiner—Leslie Pascal
Assistant Examiner—David C Payne (57) ABSTRACT

A method and a system for monitoring specific channels in a WDM system involve splitting a WDM signal into multiple parallel signals, filtering the parallel signals with corresponding individually tunable filters in order to pass specific channels to each filter, and then detecting the presence of passed channels with dedicated detectors that correspond to the tunable filters. In a preferred embodiment, the initial WDM signal is demultiplexed by wavelength into multiple different transmission groups and each filter can be individually tuned over a channel range that corresponds to the range of channels within the transmission group that is directed to the filter. The preferred individually tunable filters are vertical cavity filters formed utilizing semiconductor wafer processing techniques, and the preferred photodetectors are simple low cost single-cell photodetectors.

14 Claims, 6 Drawing Sheets

WAVELENGTH MONITOR USING HYBRID APPROACH

TECHNICAL FIELD

The present invention relates to wavelength monitoring of multi-wavelength optical signals in optical communications systems.

BACKGROUND ART

High data rates are achieved in optical communications systems using wavelength division multiplexed (WDM) signals. WDM signals are multi-wavelength optical signals that include multiple channel signals, each at a predefined channel wavelength. In a WDM-based optical communications system, the channel signals are generated by a series of modulated transmitters and the channel signals may be separated by 25 GHz to 200 GHz within the 1528–1565 nm wavelength range. The 1528–1565 nm wavelength range is within the flat gain region of a erbium doped fiber amplifier (EDFA), a critical component of modern optical communications systems. Performance of an optical communications system can be verified by monitoring the wavelength, power, and signal-to-noise ratio of each of the WDM channel signals. Wavelength monitoring of the channel signals assures that deviations from the predefined channel wavelengths due to drifts or instabilities in the transmitters are detected. Wavelength monitoring also verifies that channel signals subsequently added to the multi-wavelength optical signals are within specified wavelength deviations of the precisely defined channel wavelengths.

While wavelength monitoring can be performed using commercially available optical spectrum analyzers (OSAs), OSAs that include motors to rotate optical gratings or optical filter elements may be too large to be integrated within an optical communications system. In addition, the mechanisms required to rotate the optical gratings present many operational and reliability problems. OSAs based on tunable Fabry-Perot interferometers are also utilized for wavelength monitoring. Disadvantages of simple tunable Fabry-Perot filters include the limited tuning range and poor resolution that limits channel differentiation.

OSAs based on InGaAs/InP photodetector arrays have a small physical size, but are expensive to manufacture, making it economically unfeasible to incorporate the OSAs into most optical communication systems. For example, an OSA that utilizes a fixed optical grating and a linear photodetector array to detect multiple wavelengths (i.e., channels) must have at least one individually addressable pixel element for each channel that is to be identified. In a dense wavelength division multiplexed (DWDM) system of, for example, 1,000 channels, a complex and costly detector array having at least 1,000 individually addressable pixels is required.

Optical measurement instruments other than OSAs, such as multi-wavelength meters, are also used to monitor the wavelength of channel signals. However, many of these types of instruments are physically large and expensive to manufacture.

As a result of the disadvantages of prior art wavelength monitors, what is needed is a wavelength monitor that can be tuned over the broad wavelength range commonly used for WDM optical communications systems and with the high resolution required for narrow channel spacing in an environment that requires no moving parts.

SUMMARY OF THE INVENTION

A method and a system for monitoring specific channels in a WDM system involve splitting a WDM signal into multiple parallel signals, filtering the parallel signals with individually tunable filters in order to pass specific channels through each filter, and then detecting the presence of passed channels with dedicated detectors that correspond to the individually tunable filters.

In a preferred embodiment, the initial WDM signal is demultiplexed by wavelength into transmission groups, with each transmission group including multiple channels in a continuous wavelength range. The transmission groups are then filtered by group-specific filters which are preferably formed utilizing semiconductor wafer processing techniques. Each of the group-specific filters can be individually tuned to pass a specific channel from the transmission group with which the filter is associated. The group-specific filters are preferably tunable over channel ranges that correspond to the channel ranges of the respective transmission groups. That is, each filter is tunable over a different channel (i.e., wavelength) range such that the entire wavelength range of the optical system is covered by the combination of the filters. Specific channels that pass through the filters are detected by simple low cost photodetectors. By demultiplexing the WDM signal into parallel transmission groups, WDM signals having a broad wavelength range can be monitored with a combination of relatively simple filters and photodetectors. This reduces significantly the requirements on the filter and detector array.

The preferred wavelength monitoring system includes an input section, a splitter, tunable filters, and detectors. The input section enables the multiplexed optical signals to enter the splitter. The input section is preferably an optical fiber, but may be free space or a device such as an optical V-groove array. The splitter may include a conventional power splitter that divides the energy of optical signals into transmission groups, without regard to wavelength, for transmission over multiple optical paths. In a preferred embodiment, the splitter is a demultiplexer that divides the optical signals by wavelength into transmission groups that include subsets of the original wavelength range. The tunable filters are preferably vertical cavity filters that are fabricated onto monolithic substrates utilizing photolithographic processes. The tunable filters are individually tunable over wavelength ranges that may include the entirety of the original wavelength range of the particular optical communications system, or that preferably include subsets of the original wavelength range. Each filter has a passband that is equal to or less than the bandwidth of a single channel, depending on the application. The individually tunable filters are calibrated so that the particular passband of each filter can be determined at any particular time. The detectors include conventional photodetectors that generate electrical current in response to the presence of optical energy. Because the tunable filters pass optical energy of known wavelengths, the photodetectors are not required to be channel sensitive.

In a preferred operation, WDM optical signals are input into the demultiplexer through an input fiber. The WDM signals are demultiplexed into optical signals of different wavelength ranges. The demultiplexed optical signals are then transmitted to respective vertical cavity filters via optical paths. Each of the vertical cavity filters is tunable over a unique wavelength range, with the wavelength ranges generally corresponding to the demultiplexed wavelength ranges of the WDM signals. The vertical cavity filters are individually tuned to selectively pass one optical channel, while blocking transmission of all other optical channels.

Optical energy that passes through the vertical cavity filters is incident on the corresponding photodetectors. The detection of optical energy by the photodetectors is correlated to the wavelength of optical energy (i.e., channel) that was allowed to pass through the respective filter at the corresponding time. The vertical cavity filters can be successively tuned to sweep across all of the wavelengths in the respective wavelength ranges in order to determine the presence or absence of channels within each range.

By dividing the multiplexed incoming optical signals into transmission groups, the individually tunable filters in the wavelength monitor need only be tunable over a portion of the total wavelength range of the incoming WDM signals. In addition, because each of the optical filters passes only one channel at a time, each photodetector in the wavelength monitor can be an unsophisticated and inexpensive single-cell photodetector. In contrast, a conventional monitoring system having a fixed grating typically requires a large detector array that includes an individually addressable pixel for each monitored channel.

DETAILED DESCRIPTION

Figure 1:
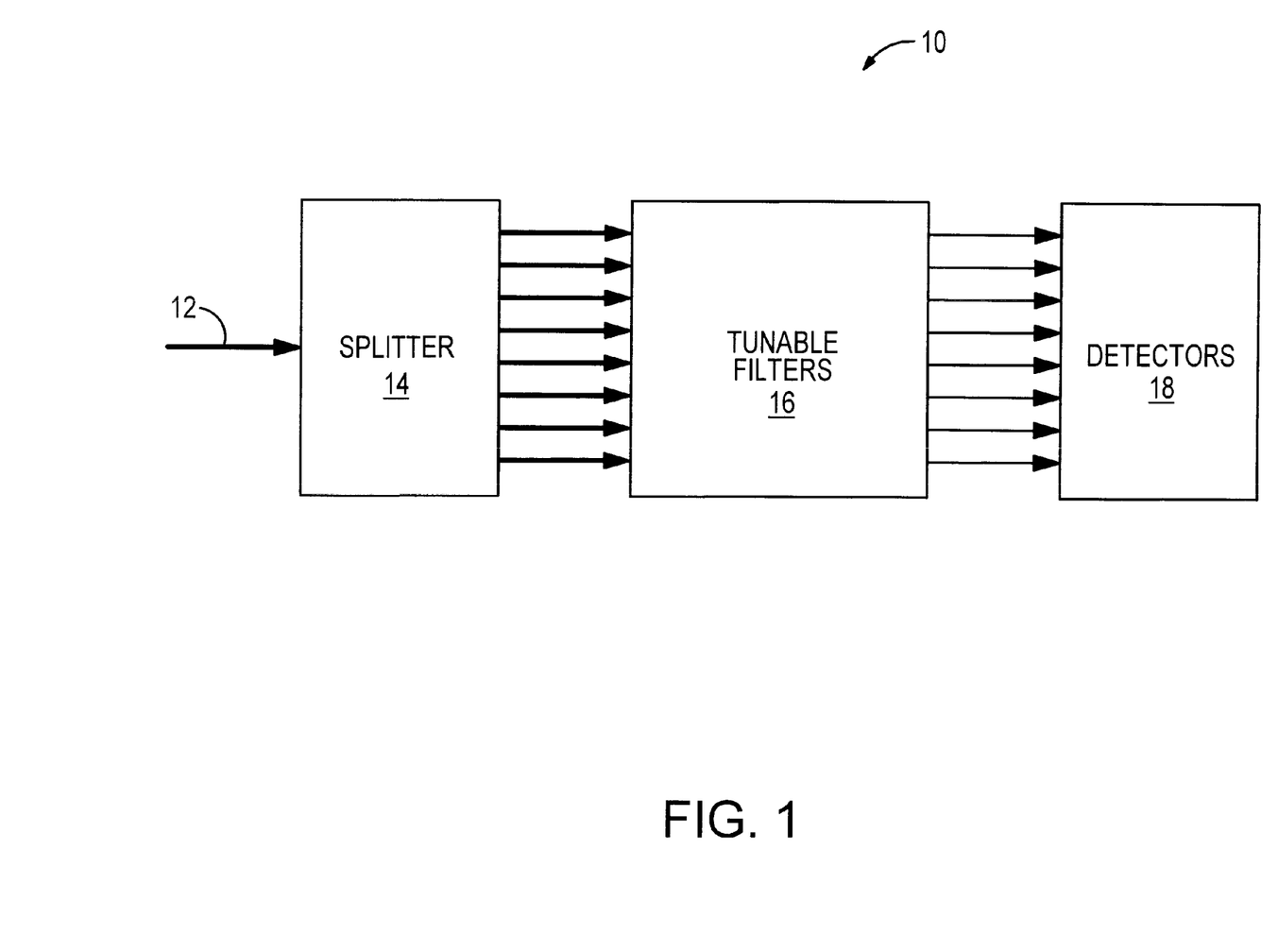
FIG. 1 is a block diagram of a wavelength monitoring system in accordance with the invention.

FIG. 1 is a block diagram of the basic components of a wavelength monitoring system 10 in accordance with the invention. The wavelength monitoring system includes an input section 12, a splitter 14, tunable filters 16, and detectors 18. As will be described in further detail below, the basic operation of the optical monitoring system involves receiving multiplexed optical signals, splitting the optical signals into multiple parallel signal groups, independently filtering each of the signal groups in parallel using respective tunable filters to pass specific narrowband channels, and then detecting the amount of optical energy, if any, that passes through each filter in order to determine whether specific narrowband channels are present in the respective signal groups. In FIGS. 1, 2, 4, and 5, optical paths carrying unfiltered WDM signals are depicted with thicker lines, while optical paths carrying filtered WDM signals are depicted with thinner lines. Depending on the application, the monitoring system can be operated to measure actual channel wavelengths or to determine whether a predefined channel is active or inactive.

In FIG. 1, the input section 12 enables the multiplexed, or multi-wavelength, optical signals to enter the splitter 14. The input section is preferably an optical fiber, but may be free space or a device such as an optical V-groove array. The input section may also include lenses to direct the optical signals into the splitter.

The splitter 14 may be a conventional power splitter that divides the energy of the optical signals into transmission groups, without regard to wavelength, for transmission over multiple optical paths. The splitter may include for example, a 1×N coupler that distributes the optical energy of an input signal throughout the N outputs. As an alternative to a splitter that divides the energy of all wavelengths, the splitter may function as a demultiplexer that divides the WDM optical signals by wavelength. For example, the splitter may be a waveguide demultiplexer. The demultiplexer preferably separates the optical signals into continuous wavelength bands that include multiple individual channels in each band.

The tunable filters 16 are preferably fabricated onto monolithic substrates using photolithographic processes. The tunable filters are individually tunable over wavelength ranges that may include the entire wavelength range of the particular optical communications system or the filters may be tunable over subsets of the original wavelength range. Preferably, each filter has a passband, or resolution, that is less than the bandwidth of a single channel. The tunable filters are calibrated so that the particular passband of each filter can be determined at any time. Examples of photolithographically formed filters include vertical cavity filters, Fabry-Perot filters, and planar waveguide filters. The individual filters may be formed on a single substrate to create a filter array, or the filters may be physically disconnected. The vertical cavity filters are preferably tuned by individually applying current to the filters in order to shift the passbands of the filters.

The detectors 18 are conventional photodetectors that generate electrical current in response to the intensity of optical energy. Examples of acceptable photodetectors include InGaAs detectors. The photodetectors may be distinct from the filters 16 or the photodetectors may be integrated onto the same monolithic structure as the filters. Because the tunable filters are calibrated to pass optical energy of known wavelengths, the photodetectors do not have to be channel sensitive. That is, each photodetector related to each optical path is preferably a single non-spatially resolving photodetector that is responsive to any optical energy that is incident on the particular photodetector. In contrast, as described above, multi-wavelength optical monitoring systems that utilize fixed gratings are required to have large photodetector arrays that include multiple individually addressable pixels in order to distinguish individual wavelengths. In addition to monitoring the wavelength of optical signals, the channel power of particular channels can be determined from the photodetectors as necessary, although this is not critical to the invention.

For example purposes, the preferred optical monitoring systems are described in detail below with reference to optical communications systems that function over an approximately 40 nm wavelength range, centered approximately around 1550 nm (193.1 THz), as recommended by the International Telecommunications Union (ITU). The preferred monitoring systems are described to identify individual channels having a channel spacing of 0.4 nm (50 GHz). With a range of 40 nm and a channel spacing of 0.4 nm, roughly 100 channels (i.e., wavelengths) are available for transmitting data and therefore the monitoring systems must be able to individually identify each of the potential 100 channels.

Figure 2:
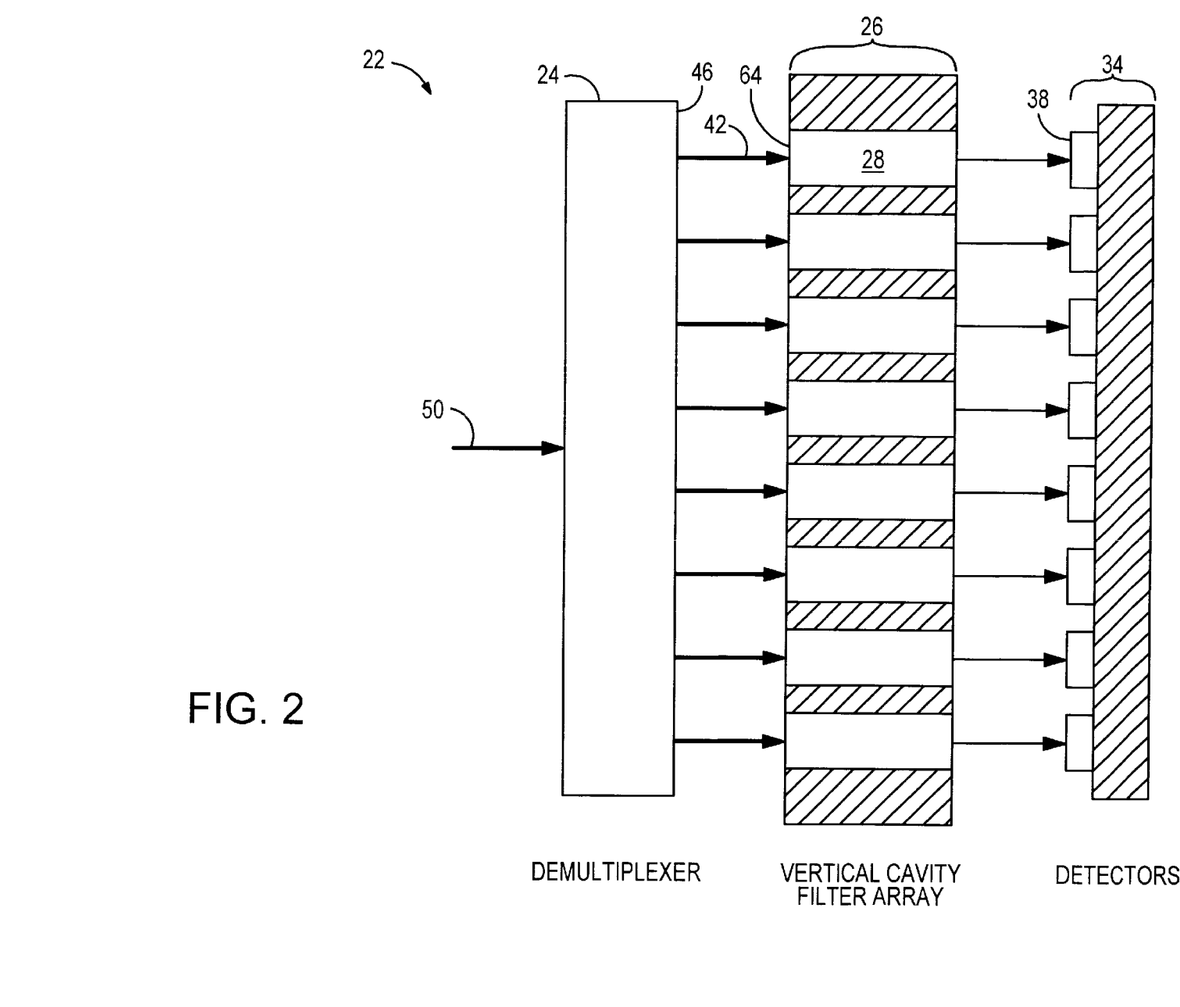
FIG. 2 is an expanded block diagram of a wavelength monitoring system in accordance with the invention.

FIG. 2 is a more detailed depiction of a preferred optical monitoring system 22 that is designed to operate under the above described optical parameters. The optical monitoring system of FIG. 2 includes a 1×8 demultiplexer 24, a vertical cavity filter array 26 that includes eight separate vertical cavity filters 28, and a photodetector array 34 that includes eight separate photodetectors 38. The demultiplexer functions to divide the incoming optical signals by wavelength for transmission over separate dedicated optical paths 42. For example, with an optical signal wavelength range of 40 nm, the demultiplexer preferably divides the incoming signals into eight transmission groups, or subsets, that span roughly 5 nm each. It is preferred that there is overlap between transmission groups and therefore each transmission group preferably spans greater than 5 nm. Without taking into account overlap, the eight wavelength bands are approximately 1530–1535 nm, 1535–1540 nm . . . 1560–1565 nm, and 1565–1570 nm. At a channel spacing of 0.4 nm, there are approximately 12 channels allotted to each transmission group. In a most preferred embodiment, the optical signals are output from the demultiplexer near normal to the output surface 46 of the demultiplexer. Near normal output enables optimal filtering by the vertical cavity filters.

The vertical cavity filter array 26 includes dedicated filters 28 associated with the respective optical paths 42 that extend from the demultiplexer 24. The individually tunable filters are tunable over wavelength ranges that correspond to the eight wavelength ranges output by the demultiplexer. In order to account for channels that are located at the interface between two wavelength ranges (e.g., 1535 nm), the tunable ranges of the eight vertical cavity filters preferably overlap slightly with one another. The vertical cavity filters have passbands (i.e., resolution) that allow a single channel to be passed from each filter, so that individual channels can be identified.

In operation, WDM optical signals are input into the demultiplexer 24 through the input fiber 50. The WDM signals are demultiplexed into transmission groups that include optical signals of the eight described wavelength ranges, with each range including around 12 channels. The demultiplexed optical signals are then transmitted to a respective one of the eight vertical cavity filters 28 via the optical paths 42. The eight vertical cavity filters 28 are individually tuned to selectively pass one optical channel while blocking transmission of all other optical channels. Optical energy that passes through the vertical cavity filters is incident on the corresponding photodetectors 38. The detection of optical energy by the photodetectors is correlated to the wavelength of optical energy (i.e., channel) that was allowed to pass through the respective filter at the corresponding time. The vertical cavity filters can be successively tuned to pass all of the wavelengths in the respective wavelength band in order to determine the presence of each channel of a range of channels.

For example purposes, assume that the wavelength range of 1530–1535 nm is transmitted from the demultiplexer 24 to the top vertical cavity filter 28. All of the optical signals in the 1530–1535 nm range enter into the top vertical cavity filter and the vertical cavity filter is tuned to sweep across the 5 nm wavelength range in roughly 0.04 nm increments. Optical energy passing through the filter is measured by the photodetector and related to a specific channel. An electronic processing system (not shown) connected to photodetector array 34 processes the detector signals for subsequent use and/or display. Although the monitoring system of FIG. 2 demultiplexes the incoming WDM signal into eight transmission groups, the exact number of transmission groups, filters, and photodetectors is not critical to the invention. In addition, although not specifically mentioned, certain additional optical devices, such as lenses and/or broad passband filters, may be included in the monitoring system as needed.

Figure 3:
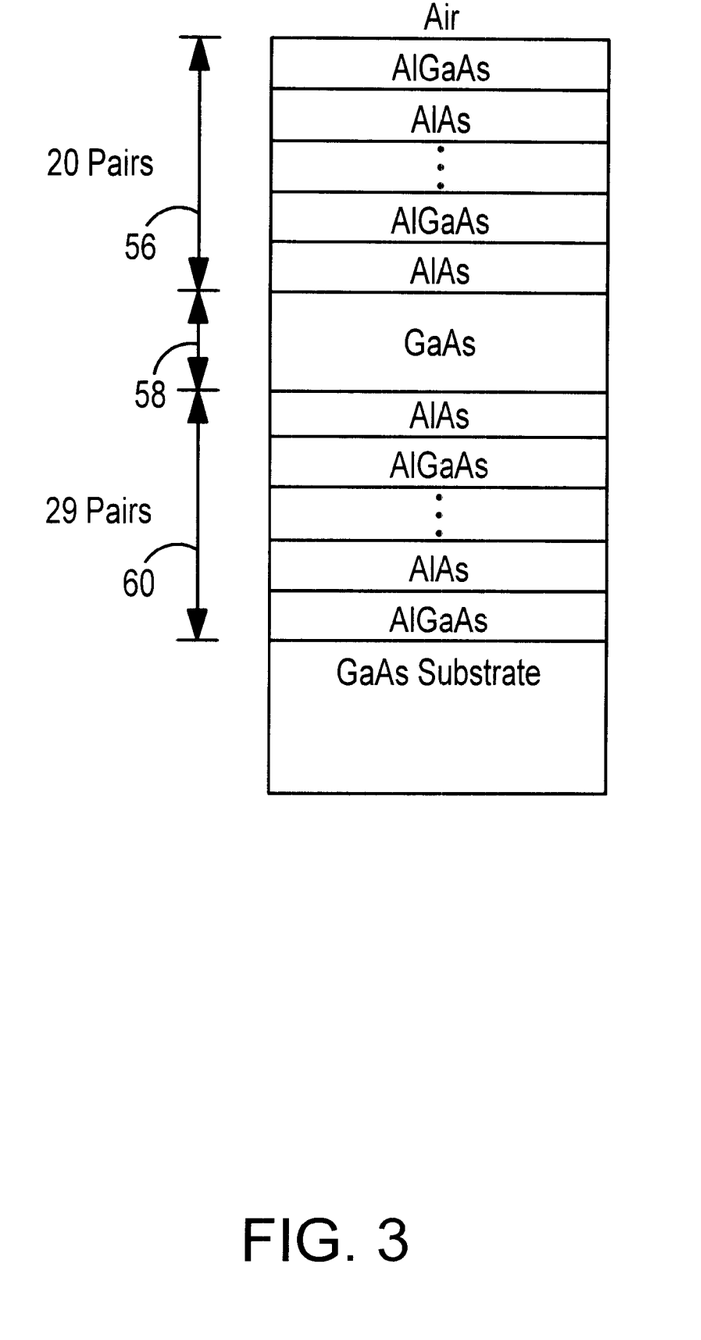
FIG. 3 is a depiction of the layers of a preferred vertical cavity filter to be used with the wavelength monitoring system of FIG. 2 in accordance with the invention.

Design considerations with regard to the vertical cavity filter array 26 depicted in FIG. 2 are described herein. Specifically, FIG. 3 is a depiction of the layers of an example vertical cavity filter. The top stack 56 of layers is preferably formed of 20 pairs of AlGaAs and AlAs layers. The middle layer 58 is a resonant cavity that is preferably formed of GaAs and has a thickness that is dependent on the target passband wavelength for the filter. The bottom stack 60 of layers is preferably formed of 29 pairs of AlAs and AlGaAs layers which are formed on a GaAs substrate. Specifics on design considerations for vertical cavity filters are found in R. P. Stanley et al., "Ultrahigh Finesse Microcavity with Distributed Bragg Reflectors," Applied Physics Letters, Vol. 65, No. 15, pp. 1883–1885 (October 1994). The preferred vertical cavity filters have large free spectral ranges (FSR) and high resolution, which translate into a high finesse value, where finesse equals the FSR/resolution. Mode field diameter (MFD) characteristics of the optical signals which should be considered with respect to vertical cavity filter design are described in D. I. Babic et al., "Modal Reflection of Quarter-Wave Mirrors and Vertical-Cavity Lasers," IEEE, J. Quantum Electronics, Vol. 29, No. 6, pp. 1950–1962 (June 1993).

In accordance with the invention, tuning of a vertical cavity filter 28 may be accomplished by applying current to the center of the filter in order to affect the temperature of the filter and/or the refractive index of the filter. A drawback to adding current to the center of the filter is that the dopants required to conduct the current have negative affects on the optical properties of the filter. Alternatively, a vertical cavity filter can be tuned by applying current to heater elements that are located on the outer surface of the filter. Another alternative involves utilizing a combination of the two above-mentioned approaches to tune a vertical cavity filter. Because vertical cavity filters can exhibit large free spectral ranges, additional arrayed waveguides or broad bandpass filters, are not typically required before or after the vertical cavity filters in order to block interfering optical energy.

When utilizing vertical cavity filters in a system as shown in FIG. 2, it is preferred that the incoming optical signals to the filters 28 are near to normal with respect to the receiving surface 64 of the filter, but not exactly normal. In order to optimize operation of the preferred filters, the demultiplexer 24 is preferably designed to output optical signals close to normal with respect to the output surface 46 of the demultiplexer.

Figure 4:
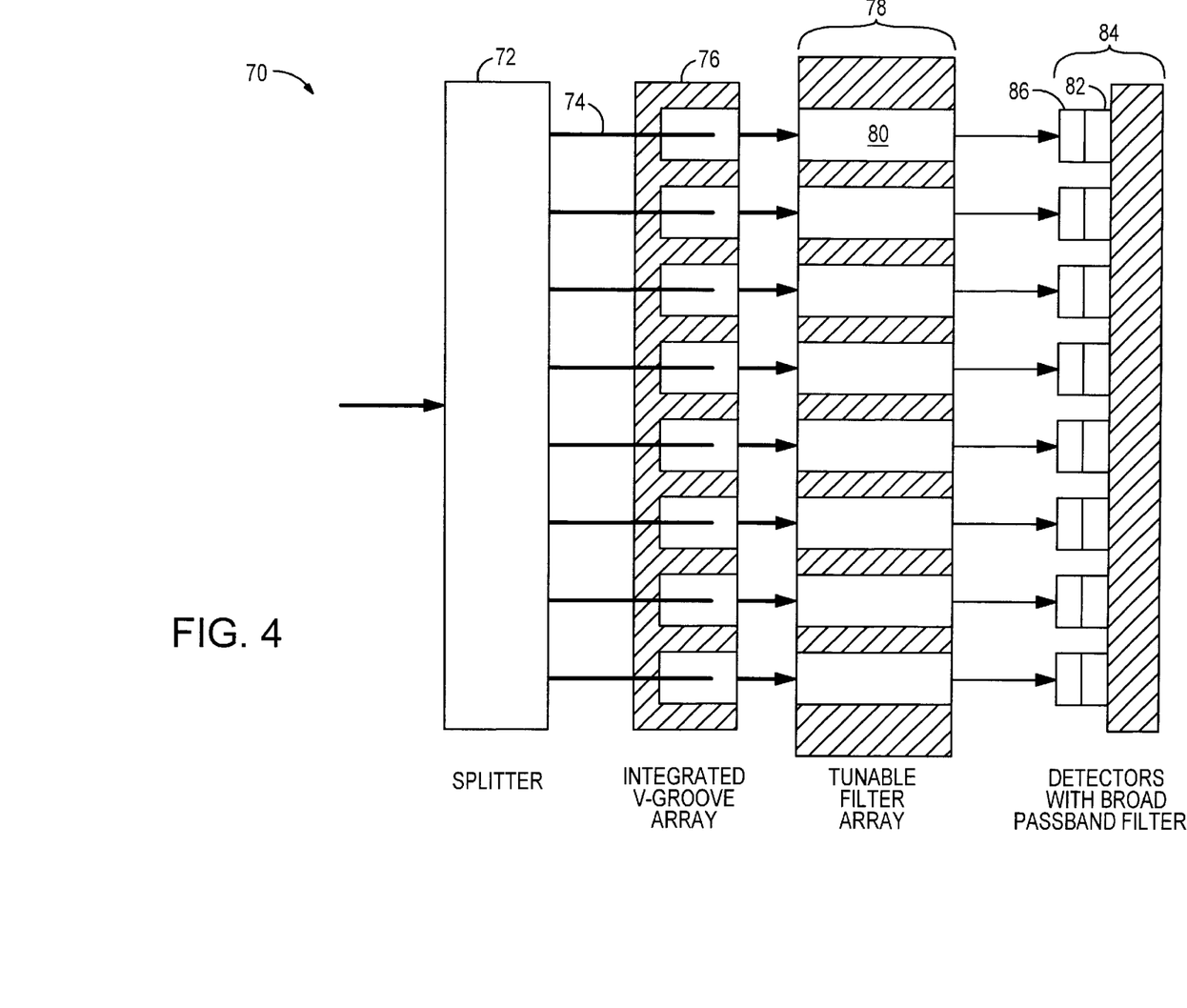
FIG. 4 is an expanded block diagram of a wavelength monitoring system that utilizes an integrated V-groove array and broad passband filters in accordance with the invention.

FIG. 4 is another depiction of a preferred embodiment of a wavelength monitor 70 in accordance with the invention. In this embodiment, the splitter 72 is again a demultiplexer that divides the incoming optical signals into separate transmission groups that are divided by continuous wavelength bands. As with the monitor system described with reference to FIG. 2, the incoming optical signals are divided into eight separate transmissions groups, with each transmission group covering an approximately 5 nm wavelength band. Combined, the eight transmission groups cover the 100 channels occupying the 40 nm wavelength range from 1530 nm to 1570 nm. The eight separate transmission groups are transmitted in parallel through dedicated fibers 74 to an integrated V-groove array 76, which functions to align the transmission fibers such that the respective optical signals can be directly transmitted into the tunable filter array 78. The integrated V-groove array reduces the need to have the splitter output optical signals that are near normal to the splitter output surface. Each of the eight transmission groups is transmitted in parallel from the integrated V-groove array to respective group-specific filters 80 within the tunable filter array. Each of the filters is individually tunable over a range that corresponds to the wavelength range of the respective transmission group. By dividing the multiplexed incoming optical signals into transmission groups, the individually tunable filters need only be tunable over ⅛th of the total wavelength range of the optical communications system.

The output from each tunable filter 80 is transmitted to a dedicated photodetector 82 of a detector array 84. In situations where the free spectral range of the tunable filters is not sufficiently large to eliminate optical interference from passing to the photodetectors, or where the periodic response of the filters allows optical interference to pass to the photodetectors, broad passband filters may be necessary to filter out interfering optical energy. For example, referring to FIG. 4, broad passband filters 86 are associated with each photodetector. In operation, after passing through the tunable filters and the broad passband filters, the filtered optical energy is detected by the individually addressable photodetectors. In the preferred embodiment, each photodetector is a simple and inexpensive single cell detector. This is in contrast to the fixed grating monitoring system described above wherein a large detector array, including upwards of 1,000 individually addressable pixels, is required to monitor 1,000 channels.

In a system that utilizes a simple splitter instead of a demultiplexer, tunable filters that span subsets (i.e., 1530–1535 nm . . . 1565–1570 nm) of the entire wavelength band can be utilized in conjunction with broad passband filters, or filters that span the entire wavelength band (i.e., 1530–1570 nm) can be utilized.

Figure 5:
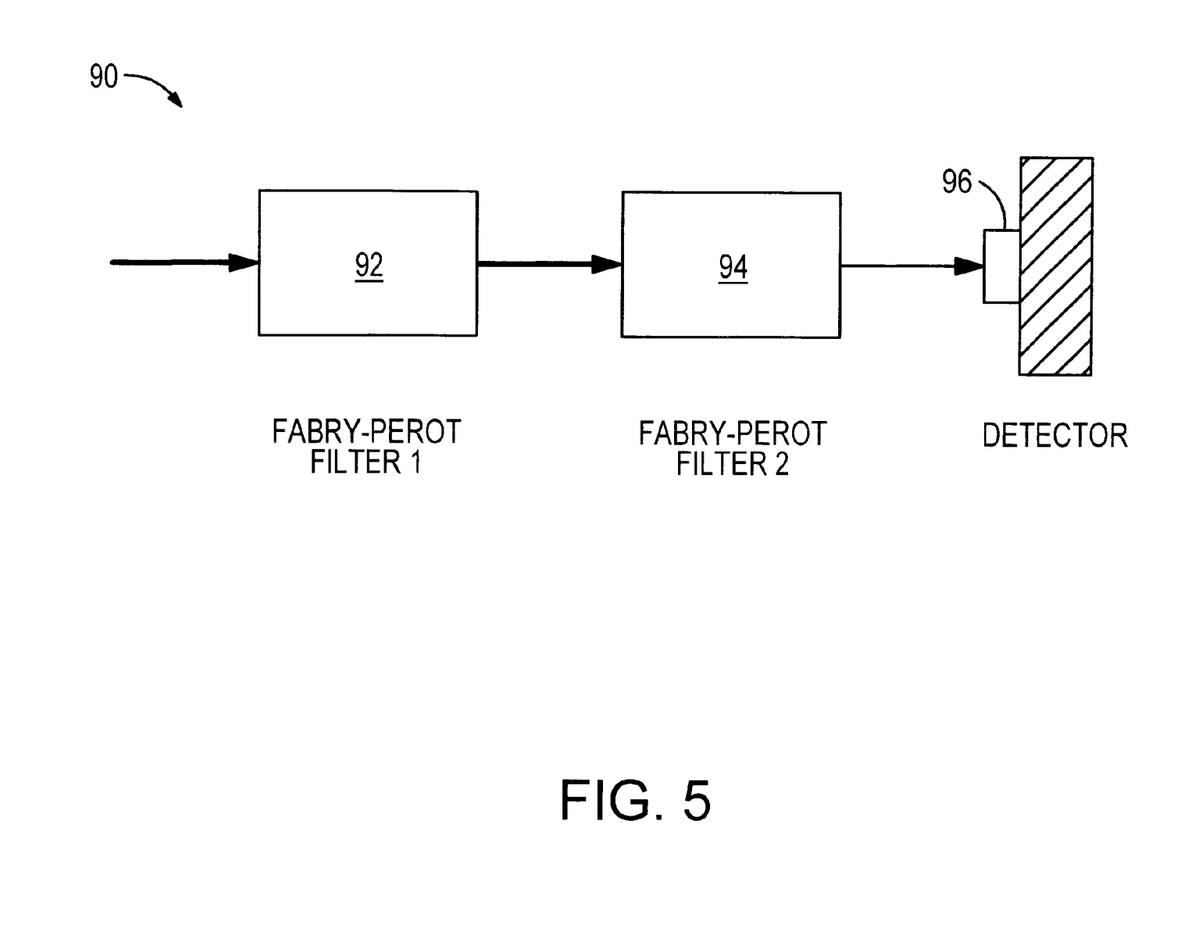
FIG. 5 is a depiction of a wavelength monitoring system that utilizes cascaded Fabry-Perot filters in accordance with the invention.

FIG. 5 is a depiction of another alternative embodiment of an optical monitor 90 in which two optical filters 92 and 94 are located in series in order to provide tuning over the required channel range while utilizing a single detector. In the preferred embodiment, the two filters are semiconductor-based Fabry-Perot filters having tuning ranges that cover their own free spectral ranges. After passing through the two filters, the filtered light is detected by a simple detector 96.

Figure 6:
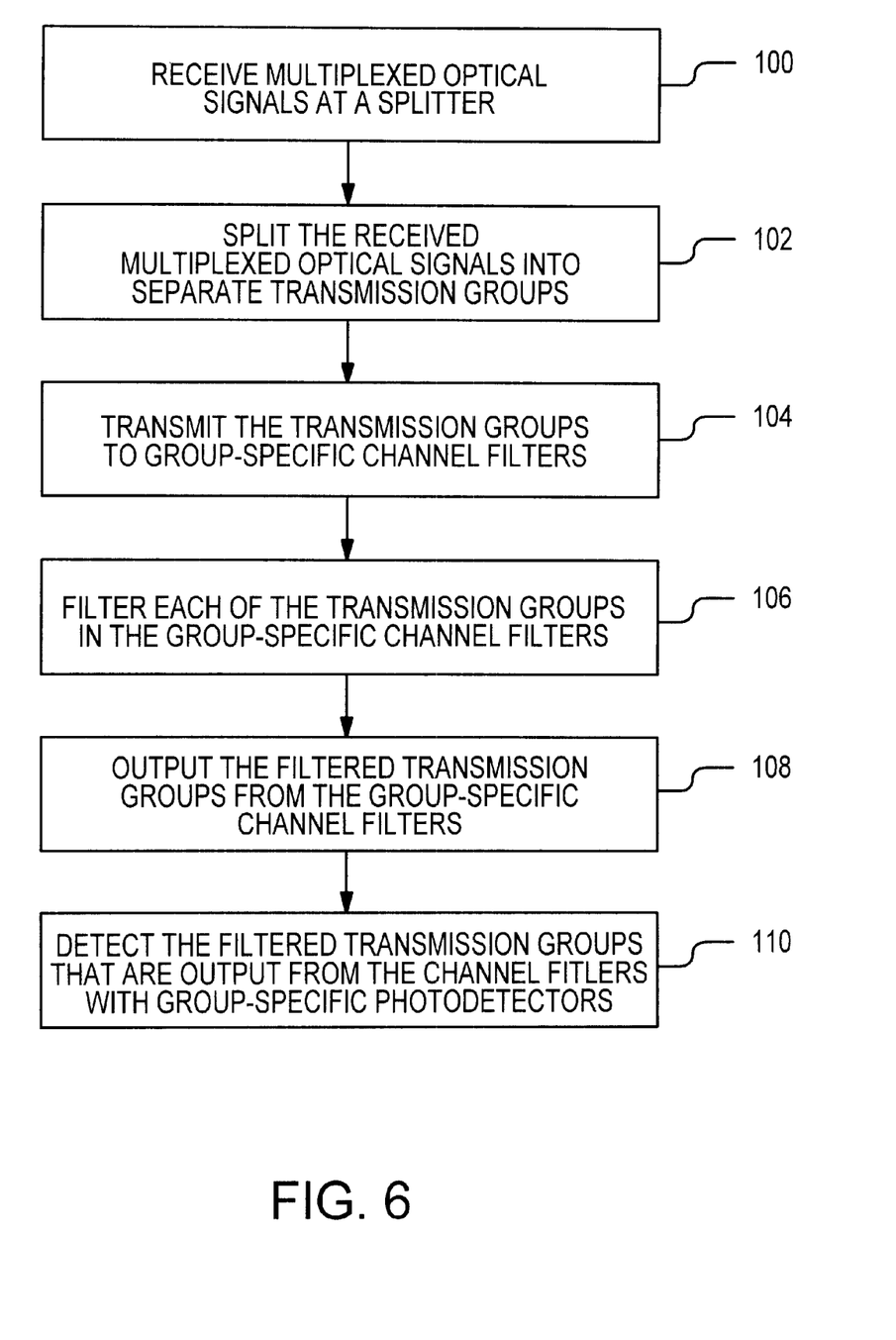
FIG. 6 is a process flow diagram of a method for wavelength monitoring in accordance with the invention.

A preferred method for monitoring specific channels within a WDM-based optical communications system is depicted in the process flow diagram of FIG. 6. In a step 100, multiplexed optical signals are received at a splitter, wherein the multiplexed optical signals include multiple channels. In a step 102, the received multiplexed optical signals are split into separate transmission groups, wherein each transmission group includes a unique portion of the channels. In a step 104, the transmission groups are transmitted to group-specific channel filters. In a step 106, each of the transmission groups is filtered in respective group-specific channel filters. In a step 108, the filtered transmission groups are output from the group-specific channel filters. In a step 110, the filtered transmission groups that are output from the channel filters are detected with group-specific detectors. In an alternative, instead of simply being split, the multiplexed optical signals are demultiplexed into the transmission groups, wherein the demultiplexed transmission groups are made up of different wavelength bands. In another alternative, in conjunction with the filtering step, the group-specific channel filters are individually tuned over unique channel ranges that correspond to the demultiplexed transmission groups.

What is claimed is:

1. A wavelength monitor for use in optical communications systems comprising:

a splitter connected to receive an input signal formed of a plurality of multiplexed optical signals having different wavelength-based channels, said splitter having outputs connected to transmit subsets of said plurality of multiplexed optical signals onto separate optical paths, at least some of said subsets including more than one of said optical signals;

a plurality of individually tunable optical filters corresponding on a one-to-one basis to said separate optical paths, each of said individually tunable optical filters having an input for receiving one of said subsets of multiplexed optical signals and an output for outputting a filtered optical signal, each said individually tunable optical filter being dedicated to recurringly vary selection of said filtered optical signal at said output by recurring retuning to alternative said wavelength-based channels; and a plurality of individually addressable photodetectors aligned to correspond on a one-to-one basis to said outputs of said individually tunable optical filters, said individually addressable photodetectors detecting said filtered optical signals that are output from corresponding ones of said plurality of individually tunable optical filters.

2. The wavelength monitor of claim 1 wherein, for each said recurring retuning, each one of said plurality of individually tunable optical filters blocks transmission of all but one of said wavelength-based channels in the subset of optical signals that is received by said individually tunable optical filter from said splitter.

3. The wavelength monitor of claim 2 wherein said splitter is a demultiplexer that divides said input signal by wavelength, such that each of said subsets represents a unique continuous wavelength band that includes a plurality of said wavelength-based channels.

4. The wavelength monitor of claim 3 wherein each one of said plurality of individually tunable optical filters is tunable over a different wavelength range, where each said different wavelength range corresponds to one of said unique continuous wavelength bands output by said demultiplexer.

5. The wavelength monitor of claim 2 wherein said plurality of individually tunable optical filters is a plurality of vertical cavity filters.

6. The wavelength monitor of claim 1 wherein said plurality of individually tunable optical filters is a plurality of semiconductor-based Fabry-Perot filters.

7. The wavelength monitor of claim 1 wherein said individually tunable optical filters are formed on a common substrate.

8. A method for monitoring specific channels within a WDM-based optical communications system comprising steps of:

receiving multiplexed optical signals, said multiplexed optical signals including multiple channels;

splitting said received multiplexed optical signals into separate transmission groups, each of said transmission groups including a portion of said channels;

transmitting said transmission groups to group-specific channel filters so as to associate each said transmission group with one of said channel filters;

filtering each of said transmission groups in said channel filters such that each said channel filter serially passes said channels of said associated transmission group, thereby providing progressions of channels to be output, said filtering being related to selections of wavelengths;

outputting said progressions of said channels from said channel filters; and detecting said progressions of said channels that are output from said channel filters with group-specific photodetectors in order to verity receptions of particular channels.

9. The method of claim 8 wherein said step of filtering includes a step of individually tuning each of said group-specific channel filters to affect which channels within said transmission groups pass through respective ones of said group-specific channel filters.

10. The method of claim 9 wherein said step of tuning includes a step of individually applying electrical current to said group-specific channel filters to affect channel filtering characteristics of said channel filters.

11. The method of claim 9 wherein said step of splitting includes a step of demultiplexing said multiplexed optical signals into said transmission groups, wherein said demultiplexed transmission groups are made up of different channel ranges, and wherein said step of individually tuning includes a step of individually tuning each of said group-specific channel filters over unique channel ranges that correspond to said channel ranges of said demultiplexed transmission groups.

12. The method of claim 8 wherein said step of filtering includes a step of filtering said transmission groups in parallel, and wherein said step of detecting includes a step of detecting said filtered transmission groups in parallel.

13. A wavelength monitor for use in optical communications systems comprising:

an input section that carries multiplexed optical channels;

a splitter, connected to said input section, having an input for receiving said multiplexed optical channels and having multiple outputs for outputting portions of said multiplexed optical channels, the number of said outputs being less than the number of said optical channels;

a plurality of optical filters optically connected to said multiple outputs of said splitter on a one-to-one basis such that filtering of said portions of said multiplexed optical channels is performed in parallel, the number of said optical filters thereby being less than said number of optical channels, said optical filters having individually tunable passbands that allow a specific optical channel from said multiplexed optical channels to pass through said filters, and said optical filters being configured to be individually tunable over respective passband ranges that have a correspondence to said portions of said multiplexed optical channels; each of said optical filter being dedicated to recurringly vary selection of said specific optical channel being passed therethrough by recurring retuning to alternative said multiplexed optical channels; and a plurality of photo-detectors, optically connected to said plurality of optical filters on a one-to-one basis such that detecting said filtered optical channels is performed in parallel, said photo-detectors being individually addressable such that detected optical channels can be uniquely identified as said optical filters are individually tuned within said respective passband ranges.

14. The wavelength monitor of claim 13 wherein said splitter is a demultiplexer that divides said multiplexed optical channels into transmission groups by wavelength, with each transmission group including a unique set of optical channels, and wherein each one of said optical filters is individually tunable over a different passband range, said different passband ranges generally corresponding to said unique sets of optical channels on a one-to-one basis.

* * * * *